United States Patent [19]

Dewey

[11] Patent Number: 4,679,195
[45] Date of Patent: Jul. 7, 1987

[54] ERROR TRACKING APPARATUS IN A DATA PROCESSING SYSTEM

[75] Inventor: Loren G. Dewey, Sunnyvale, Calif.

[73] Assignee: Amdahl Corporation, Sunnyvale, Calif.

[21] Appl. No.: 721,564

[22] Filed: Apr. 10, 1985

[51] Int. Cl.$^4$ ............................................. G06F 11/00
[52] U.S. Cl. ...................................... 371/29; 371/49; 371/16
[58] Field of Search ........................ 371/16, 49, 15, 50, 371/29, 20; 364/200, 900

[56] References Cited

U.S. PATENT DOCUMENTS

| | | | |
|---|---|---|---|
| 4,381,563 | 4/1983 | Groom | 371/29 |
| 4,395,755 | 7/1983 | Wekai | 371/29 |
| 4,423,508 | 12/1983 | Shiozaki | 371/29 |
| 4,453,210 | 6/1984 | Suzuki | 371/16 |
| 4,593,391 | 6/1986 | Mizushima | 371/29 |

Primary Examiner—Michael R. Fleming
Attorney, Agent, or Firm—Fliesler, Dubb, Meyer & Lovejoy

[57] ABSTRACT

Disclosed is an error tracking apparatus for a data processing system having a plurality of data locations. At each data location at which an error is to be detected, an error detection means is provided for generating an error signal upon the detection error. Associated each error detection means is a counter means for counting system cycles and storing a system cycle count. Upon the generation of an error signal, the counter means stops counting, thereby freezing the system cycle count at a value corresponding to the occurrence of the error. The error signal is propagated through the system to generate a machine check which disables the system clock, thereby stopping the balance of the counter means at some cycle subsequent to the first detection of the error. By interrogation the system cycle counts stored in each of the counter means, an error history can be determined for the data processing system.

12 Claims, 3 Drawing Figures

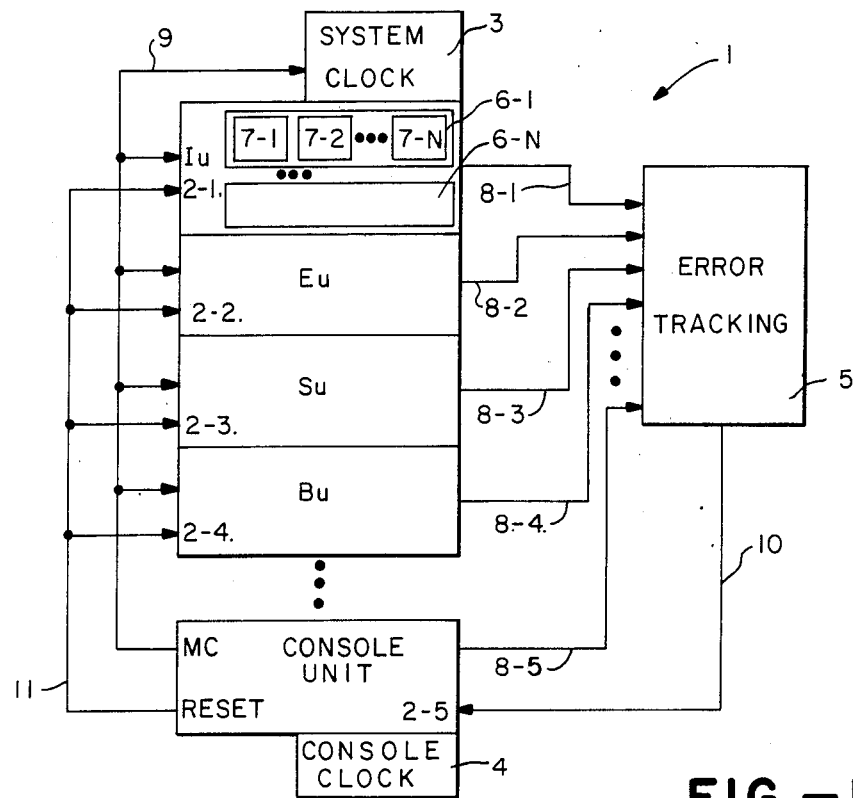
FIG.—1
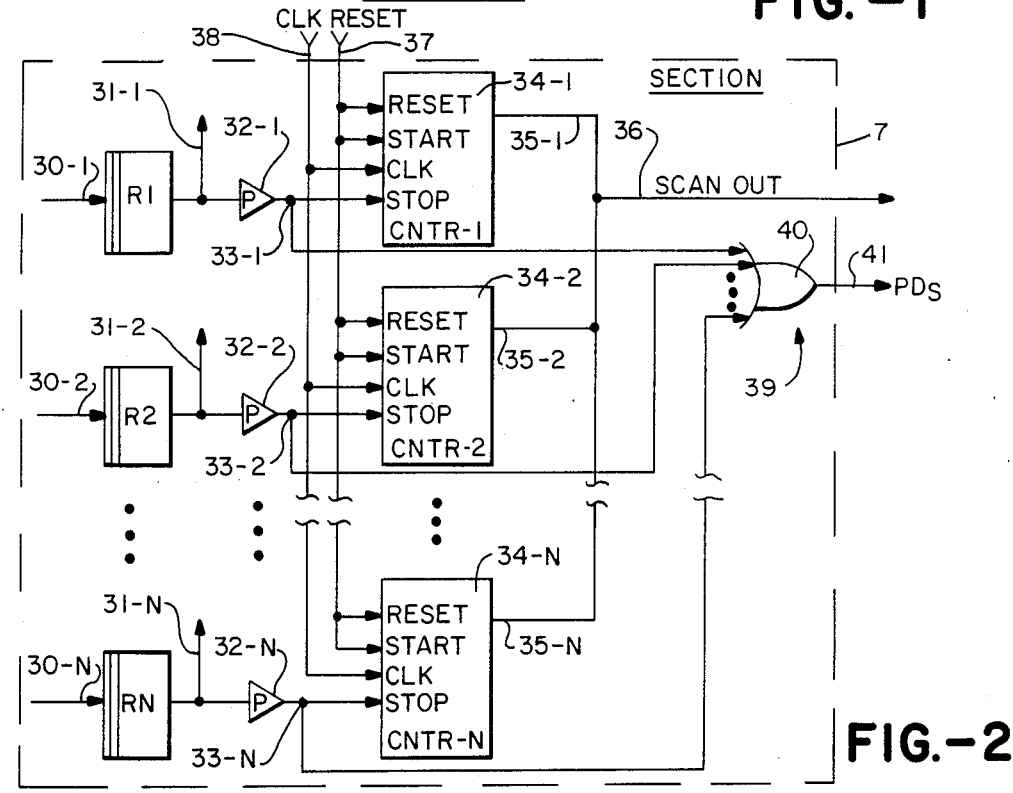
FIG.—2

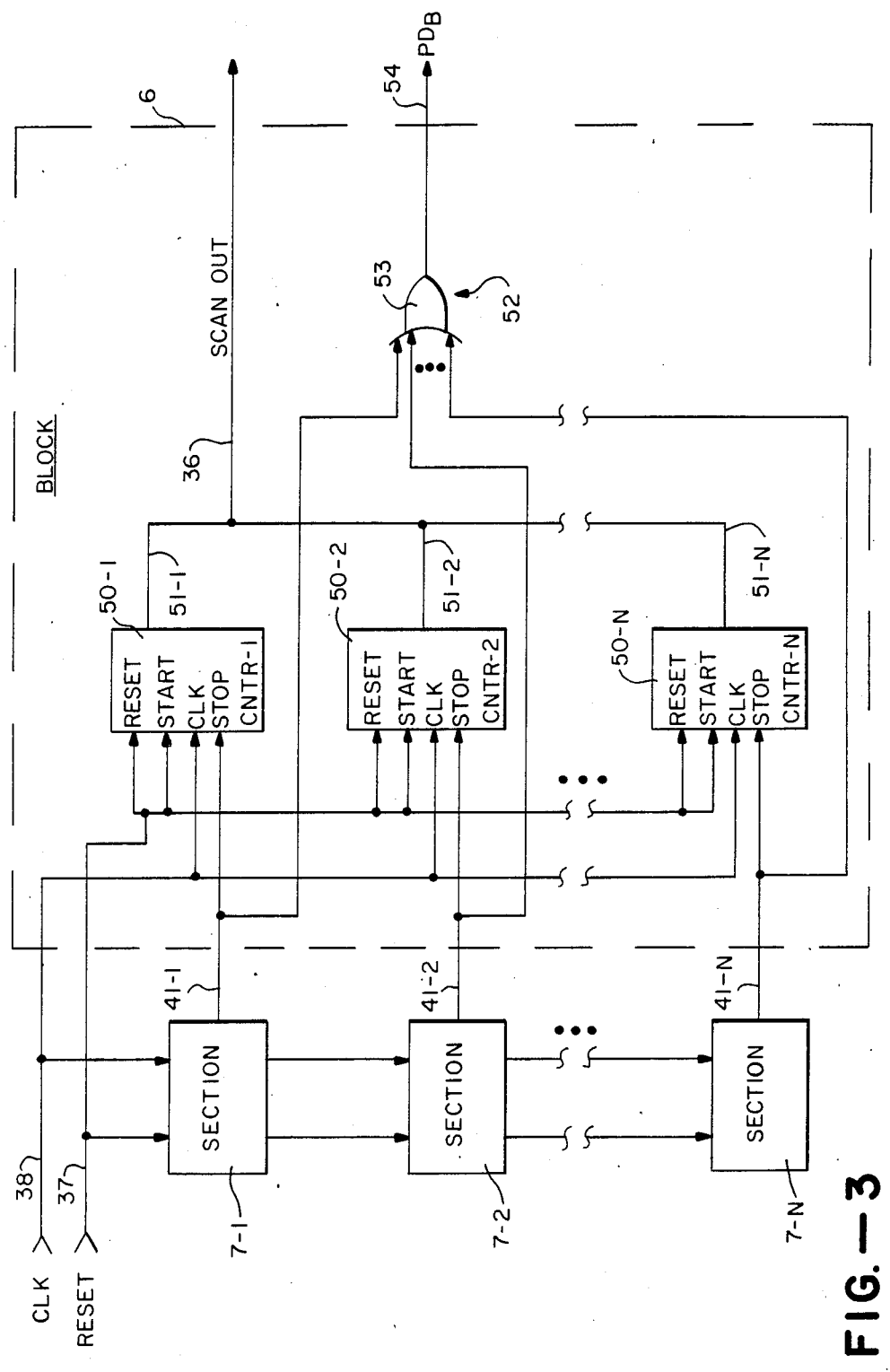
FIG.—3

ERROR TRACKING APPARATUS IN A DATA PROCESSING SYSTEM

FIELD OF THE INVENTION

The present invention relates to the field of data processing systems and more particularly to error detection and error location apparatus within data processing systems.

BACKGROUND OF THE INVENTION

In large data processing systems, the location of the circuits causing errors is a difficult task. One difficulty is that the location of data changes each cycle of the machine. Once an error is made, the error tends to become propagated to different locations throughout the machine. Further, in each subsequent cycle after the rerror-causing cycle, the original error frequently causes many more errors. This propagation and proliferation of errors tends to mask the data location which originally caused the error.

One error checking and locating mechanism is described in U.S. Pat. No. 4,132,243, entitled "Data Processing System and Information Scan Out Employing Check-sums for Error Detection" assigned to same assignee as the present invention.

In that patent, the data processing system includes an instruction-controlled principal apparatus and secondary apparatus for independently addressing and accessing points within the principal apparatus. A check-sum generator generates an actual check-sum dependent upon the data values of selected points accessed within the principal apparatus. The particular set of points accessed is controlled by the secondary apparatus. The secondary apparatus stores an expected check-sum for comparison with the actual check-sum. If a comparison indicates that the actual check sum differs from the expected check-sum, a fault is indicated within the set of points used in forming the check-sum.

Once a fault has been detected through comparisons of actual and expected check-sums, it is possible to further analyze the set of points which entered into the check-sum to determine what subset of points is the source of the fault. The set of points or the subset of points accessed to form a check-sum is controlled by the secondary apparatus.

While the check-sum mechanism of U.S. Pat. No. 4,132,243 has proved very useful, it still has the problem that it requires storage of a large number of expected check-sums to reflect the many error-free states of the computer. Furthermore, improvements and changes to the circuitry and operation of the system mandate that the expected check-sums change. Accordingly, keeping track of the expected check-sums is somewhat of an undesirable burden.

Recent data processing systems have included diagnostic scan out capabilities which help locate errors in data processing systems. One such scan out system is described in U.S. Pat. No. 4,244,019 entitled "Data Processing System Including A Program-Executing Primary System" assigned to the same assignee as the present invention.

The 4,244,019 patent provides a mechanism for scan out of all designed locations within a data processing system, independently of the normal data paths of that system. This scan out ability is of significant value in locating errors, and each location which has an error can be examined independently. However, the ablity to examine thousands of locations within a data processing system does not assist in a quick location of the errors without further information as to which locations may be the cause of the errors.

One error-tracking unit within a data processing system is described in prior U.S. patent application entitled ERROR TRACKING APPARATUS IN A DATA PROCESSING SYSTEM, Ser. No. 527,173, filed Aug. 26, 1983, now abondoned, invented by Venkatramiah Venkatesh and Robert M. Maier, which is owned by the same assignee as the present invention and was owned by the same assignee when both inventions were made. According to the prior application Ser. No. 527,173, each data location to be checked for error and to be located in the case of an error is provided with error detection circuitry. Each data location is additionally provided with an error history register for storing an error signal. When the error-detecting circuit detects an error, the error history register is enabled to store the error signal. Whenever an error is detected, the error history registers are inhibited from further change. The error detection also causes a machine check signal which, in general, prevents the data processing system from normal processing.

Further, in the prior application Ser. No. 527,173, the data locations to be error detected and error located are organized into a hierarchy of sets and subsets within the data processing system. In a three-level hierarchy the subsets are named sections, blocks, and units. Each of the data locations in a section have their error detecting signal lines combined and encoded to form a section error signal. The section error signals from a plurality of sections in turn are combined to form a block error signal. A plurality of block error signals are combined to form a unit error signal. Groups of error signals form sections, blocks and units are encoded at each level to reduce the number of error signals employed.

In the error tracking system taught by the prior application Ser. No. 527,173, under the condition that a single data location causes an error, the error signal will be propagated through the subsets. For example, a data location error signal will cause a section error signal which in turn will cause a block error signal which in turn will cause a unit error signal. The error signals identify where in the system that the error is located. The unit error signal identifies one of a number of units, the block error signal identifies one of a number of blocks in the unit, and the section error signal identifies one of a number of sections in a block.

For optimum operation of the system in prior application Ser. No. 527,173, the error history registers must be frozen in the same cycle that an error is detected. In this way, propagation of errors throughout the system is minimized. The grouping and encoding of locations to be checked provides a track which allows the error location to be easily identified.

In practice, however, freezing error history registers in the same cycle that an error is detected can be difficult to implement because all error history registers have to be notified upon the occurrence of an error at any one of the error history registers. Thus it typically takes more than one cycle in a large system to freeze all error history registers. So additional error history registers may be latched due to a single error as it propagates through the system before all registers are frozen.

Further, when the error history registers are frozen in one cycle, or a few cycles, the system may continue to process data for a number of additional cycles. During this window in which a number of system cycles may occur after the error history registers are frozen, any independent errors that may occur may not be latched and therefore may go undetected.

SUMMARY OF THE INVENTION

The present invention provides an improved error tracking apparatus which overcomes many of the problems of the prior art. According to the present invention, in a data processing system having a plurality of data locations at which errors are to be detected, a plurality of error detection means for detecting errors at respective data locations and generating error signals upon detection of errors is included. Also, associated with respective data locations, a plurality of counter means for counting system cycles and storing a system cycle count is provided. The counter means includes a means, responsive to the respective error signal, for disabling the counter means to freeze the system cycle count upon generation of the respective error signal at the given data location.

The error signal is propagated to an interrupt means, which is responsive to the error signals from the plurality of data locations, for disabling the system clock at the plurality of data locations within a minimum number of system cycles. When the system clock is disabled, the counter means at each of the data locations stops counting, and stores the system cycle count indicating when the system clock was disabled.

Also provided is a scan out means providing a data path for interrogating the counter means upon disabling of the system clock. By determining the condition of the counter means at each of the data locations, the location at which the first error occurred can be determined. Thus for an ascending counter means, the location at which the first error occurred will have a lower system cycle count stored in its respective counter means than other data locations. Also, any independent errors that may occur during the window between the first error occurrence and the disabling of the system clock will be detected. At those locations at which independent errors occur, the counter means will store a system cycle count that is less than the system cycle count at data locations at which no error signal was generated but greater than or equal to the system cycle count at which the first error occurred.

In sum, the present invention improves over the prior application Ser. No. 527,173 in that only the counter means at the location in which a data error was detected must be freezed during the same cycle as the error detection. Furthermore, since all the other counter means remain running until the system clock is disabled, there is no window in which independent errors go undetected.

BRIEF DESCRIPTION OF THE DRAWINGS

FIG. 1 depicts a data processing system organized into units, blocks and sections and including an error tracking apparatus.

FIG. 2 is a schematic representation of the error tracking apparatus of the present invention within one section.

FIG. 3 is a schematic representation of the error tracking apparatus of the present invention within one block.

DETAILED DESCRIPTION

In FIG. 1, a data processing system 1 includes a number of units, such as an instruction unit 2-1, an execution unit 2-2, a storage unit 2-3, a buffer unit 2-4, and so on. Also the data processing system 1 typically includes a console unit 2-5. The data processing system may include a system clock 3 which provides a clock signal to all of the units of the data processing system 1 or may have an independent clock on each of the units depending on the particular configuraton chosen. Also the console unit 2-5 may have an independent console clock 4 which operates the console unit 2-5 when an error condition has been detected in the main system 1.

The system 1 is for example, a high performance data processing system such as the Amdahl 580 system.

As shown, the system 1 includes an error tracking apparatus 5 in communication with each of the units of the data processing system 1.

For very large systems 1 such as the Amdahl 580 system, each of the units 2 is formed by a number of blocks 6-1, . . . 6-N. For example, the blocks typically correspond to a plurality of circuit chips on a multi-chip carrier (MCC). Shown in FIG. 1, the instruction unit 2-1 includes MCCs or blocks 6-1 through 6-N. Each of the other units 2-2, and so on, also include a similar breakdown of blocks (not shown).

Also as shown schematically in FIG. 1, the block 6-1 is broken down into a plurality of sections 7-1, 7-2 . . . 7-N. For example, the section 7-1 corresponds to a single chip on a given MCC or a subset of chips on a single MCC.

As indicated by busses 8-1 through 8-5, error conditions in each of the units 2-1 through 2-5 are communicated to the error tracking apparatus 5. The error tracking apparatus 5 then signals the console unit 2-5. The console unit then issues a machine check signal MC across line 9 which among other things operates to disable the system clock 3. The console unit 2-5 then conducts error analysis relying on its console clock 4.

The error tracking apparatus 5 communicates information to the console unit 2-5 across line 10 regarding the errors detected, as explained below with reference to FIGS. 2 and 3.

Upon completion of the error analysis, the console unit 2-5 issues a reset signal across line 11 which resets and initializes the data processing system 1.

Of course the above explanation is typical of a large data processing system, but as known in the art many other sequences of operation may occur.

FIG. 2 illustrates a portion of the error tracking apparatus 5 associated with a single section 7 within a block 6 of a unit 2 of the data processing system 1.

Each section 7 typically includes a plurality of data locations, such as registers R1, R2, . . . RN, through which data is shifted as the data processing system 1 operates. Thus, the data in the registers R1, R2, . . . RN, is received across lines 30-1, 30-2, . . . 30-N. In a following cycle of the data processing system 1, the data may be shifted out of the registers R1, R2, . . . RN across lines 31-1, 31-2, . . . 31-N.

According to the present invention, associated with each of the data locations, such as the registers R1, R2, . . . RN, is an error detection means 32-1, 32-2, . . . 32-N for detecting errors in data in its respective data location R1, R2, . . . RN. For instance, the error detection means 31-1, 32-2, . . . 32-N for detecting errors in a parity checker which checks the parity of the data in its respective register and generates an error signal on line 33-1, 33-2, . . . 33-N upon detection of a parity error.

Further, associated with each data location having a error detection means 32-1, 32-2, . . . 32-N for detecting errors and generating an error signal, is a counter means 34-1, 34-2, . . . 34-N, for counting system cycles in response to the system clock signal across line 38. Of course, as mentioned above, the clock signal across line 38 may be generated by a plurality of clocks in an asynchronous machine or by a single clock in a synchronous machine or by other configurations according to the particular data processing system 1 being utilized. However, within a given section 7, the data processing system 1 must have the capability of disabling the clock signal 38 so that the counter means 34-1, 34-2, . . . 34-N are stopped by a disabled clock essentially simultaneously. In the preferred embodiment, all clock signals supplied on lines 38 within the data processing system will be disabled in the same system cycle as explained below.

The counter means 34-1, 34-2, . . . 34-N each have a reset input which resets the counter, a start input which initializes the counter, a clock input which causes the counter to increment according to clock cycles, and a stop input.

Also each counter means 34-1, 34-2, . . . 34-N generates and stores a system cycle count on line 35-1, 35-2, . . . 35-N indicating the system cycle count at each data location. The system cycle counts on lines 35-1, 35-2, . . . 35-N are supplied to a scan-out apparatus 36 such as that taught by U.S. Pat. No. 4,244,019 entitled "Data Processing System Including a Program Executing Primary System" referred to above. Thus there is provided data path for interrogation the system cycle counts on lines 35-1, 35-2, . . . 35-N to determine the system cycle count in each of the respective counter means 34-1, 34-2, . . . 34-N.

The reset input and the start input in each of the respective counter means 34-1, 34-2, . . . 34-N are connected to receive a reset signal on line 37.

The stop input at each of the respective counter means 34-1, 34-1, . . . 34-N is connected across line 33-1, 33-2, . . . 33-N to receive the error signal generated by the respective error detection means 32-1, 32-2, . . . 32-N.

Also, the error signals supplied on lines 33-1, 33-2, . . . 33-N are supplied to a combining means 39 such as an OR-gate 40 which generates a process damage signal for the section $PD_S$ across line 41. Combining means 39 may include encoding means to further identify the nature of errors detected within a given section as explained in the prior application Ser. No. 527,173, referred to above.

In operation, the error tracking apparatus for each section 7 operates as follows. The data processing system 1 is initialized and a reset signal is generated across line 37. This clears all the counter means 34-1, 34-2, . . . 34-N simultaneously and starts them counting system cycles in response to the clock signal across line 38. The counter means 34-1, 34-2, . . . 34-N may be, for example, four bit counters which generate a revolving count of 16 system cycles. For a four bit counter, as explained below, the data processing system 1 must have the ability to freeze the system clock across line 38 in less than 16 clock cycles. For systems which require more clock cycles in which to stop the system clock, a larger counter should be utilized.

Thus the counter means 34-1, 34-2, . . . 34-N generate system cycle counts during normal operating of the data processing system 1. Upon detection of an error by, for example, the error detecting means 32-1 and the generation of an error signal across its corresponding line 33-1, the counter means 34-1 associated with the error detecting means 32-1 will stop counting and thus freeze the system cycle count at the particular data location where the error was first detected, preferably within the same clock cycle in which the error was detected. The other counting means 34-2, . . . 34-N will remain counting until the system clock on line 38 is disabled. Also, if any error at one data location such as R1 is propagated to another data location, such as RN, before the system cycle clock on line 38 is disabled, an error signal will be generated by error detecting means 32-N across line 33-N which will thereby stop counter means 34-N in a cycle subsequent to the cycle in which the data was first detected at data location R1. Thus the system cycle count on 35-N will differ from the system cycle count at 35-1 by the number of cycles by which it took the data including the error propagate from data location R1 to data location RH. By comparing the system cycle counts of counter means 34-1, 34-2, . . . 34-N, the location of the first error occurrence can be determined by determining the counter means having the lowest system cycle count (for an ascending counter) upon the disabling of the system clock across line 38. For a descending counter, of course, the opposite relationship holds.

Accordingly, for each section 7 of the data processing system 1, the counter means 34-1, 34-2, . . . 34-N will store a history of the occurrence of errors within the section.

In a preferred embodiment, the error signals on line 33-1, 33-2, . . . 33-N are combined in the combining means 39 to generate a process damage signal for the section $PD_S$ on line 41. As explained with reference to FIG. 3, the process damage signals $PD_S$ across lines 41, can be utilized to generate a second stage error history for the data processing system 1.

FIG. 3 shows an error tracking apparatus for given block 6 of the data processing system 1. As mentioned above, each block 6 will include a plurality of sections 7-1, 7-2, . . . 7-N such as that described with reference to FIG. 2. A processing damage signal for each section $PD_S$ is generated across line 41-1, 41-2, . . . 41-N. Likewise the clock signal on line 38 and reset signal on line 37 are supplied to each of the section 7-1, 7-2, . . . 7-N. Associated with each section 7-1, 7-2, . . . 7-N is a counter means 50-1, 50-2, . . . 50-N for counting system cycles. Each counter means 50-1, 50-2, . . . 50-N receives a reset signal, start signal, a clock signal and a stop signal such as described with reference to the counter means 34-1, 34-2, . . . 34-N of FIG. 2. The reset and start signals are received across line 37 from the system reset signal from, for instance, the console unit 2-5 described with reference to FIG. 1. The clock signals at each at the counter means 50-1, 50-2, . . . 50-N are received across line 38 from the system clock in a preferred embodiment. Thus upon initialization of the machine, the counter means 50-1, 50-2, . . . 50-N at the block level count system cycles, and generate and store a system cycle count across lines 50-1, 50-2, 51-N. As above, for a system 1 which takes less than 16 cycles for the system cycle clock on line 38 to be disabled upon detection of an error, each of the counter means 50-1, 50-2, . . . 50-N is a four bit counter.

Upon the generation of the process damage signal or a section PD$_S$ across for instance line 41-1, the counter means 50-1 will be signaled to stop counting and thus store the system cycle count indicating the cycle in which an error was detected in section 7-1. The balance of the counter means 50-2, . . . 50-N will continue counting until the system cycle clock on line 38 is disabled. At that time, the scan out means 36 for providing a data path for interrogating the system cycle counts on lines 51-1, 51-2, . . . 51-N is enabled by the console unit 2-5 which scans out the error history from the counter means 50-1, 50-2, . . . 50-N.

Thus according the embodiment of FIG. 3, the error tracking apparatus 5 of the present invention is able to determine within a given block 6 of the data processing system 1 which section 7 was subject to an error signal. Also, it can determine the order in which the sections 7-1,7-2, . . . 7-N became subject to errors. According to this embodiment the processing damage signals for the sections PD$_S$ across line 41-1, 41-2, . . . 41-N are supplied to a combining means 52 such as OR-gate 53 for generating a process damage signal for the block PD$_B$ across line 54. The process damage signal for the block PD$_B$ is supplied to the console unit 2-5 shown in FIG. 1 such as a cross line 10. The console unit 2-5 then generates a machine check signal cross line 9 which disables the system cycle clock on lines 38 and stops system processing. Alternatively, the processing damage signal for the block PD$_B$ cross line 54 can be again nested to a third stage error tracking apparatus at the unit level. The third stage error tracking mechanism would be similar to that shown in FIG. 3 for the second stage and allow the system to determine which unit was the first to suffer error during a given processing damage condition.

Accordingly, the present invention provides an improved error tracking apparatus for a data processng system that is not constrained by the need to freeze a large number of error history latches in a single cycle. Further, the ability to detect independent errors that may occur between the detection of the first error and the interruption of processing for analysis of the first error is provided.

The foregoing description of a preferred embodiment of the invention is made for the purposes of illustration and description. It is not intended to be exhaustive or to be limited to the precise form disclosed and, obviously many modifications and variations are possible in light of the above teaching. It is intended that the scope of the invention be defined by the Claims appended hereto.

I claim:

1. In a data processing system, including a plurality of data locations, through which data are propagated in system clock cycles in response to a system clock signal, an error tracking apparatus comprising:

a plurality of error detection means, each in communication with an associated data location, for detecting errors in the associated location and for generating an error signal upon detection of an error;

a plurality of counter means, each in communication with an associated error detection means and responsive to the system clock signal, for counting system clock cycles and storing a system cycle count for the data location associated with the respective error detection means, each of said counter means including means, responsive to an error signal from the associated error detection means, for disabling the counter means to freeze the system cycle count indicating the system clock cycle during which the error signal was generated;

interrupt means, responsive to the error signals, for disabling the system clock signal, whereby the system cycle count in each of said plurality of counter means is indicative of the system clock cycle during which the system clock signal was disabled, or during which an error signal was generated at its associated data location.

2. The apparatus of claim 1, further including:

scan out means for providing a data path for interrogation of the system cycle counts stored in the plurality of counter means upon disabling of the system clock signal.

3. The apparatus of claim 1, wherein:

said interrupt means disables the system clock signal in the same system cycle at all of said plurality of counter means.

4. The apparatus of claim 1, wherein:

said means for disabling the counter means is operable to freeze the system cycle count in the same cycle as the associated error signal is generated.

5. The apparatus of claim 1, wherein said plurality of data locations are organized into sections within the data processing system and further including:

means for combining error signals generated from data locations within a given section to generate a process damage signal for the given section.

6. The apparatus of claim 5, further including:

a plurality of counter means, each in communication with an associated section and responsive to the system clock signal, for counting system cycles and storing a system cycle count for the associated section, each of said counter means including means, responsive to a process damage signal from the associated section, for disabling the counter means to freeze the system cycle count indicating the system cycle during which a process damage signal was generated at the associated section.

7. The apparatus of claim 6, wherein said sections are organized into blocks of sections and further including:

a plurality of means, each associated with a given block and connected to receive the process damage signals from sections within the given block, for combining the received process damage signals to generate a block-level process damage signal; and wherein said interrupt means includes means responsive to the block-level process damage signals for disabling the system clock.

8. In a data processing system that includes a plurality of data registers through which data words are propagated in system cycles during processing according to a system clock signal, and a system clock generating the system clock signal responsive to a disable signal for stopping the system clock signal, an apparatus for tracking errors comprising:

a plurality of error detection means, each in communication with one of the data registers and responsive to the data word in the one data register during a system cycle, for detecting errors at the one data register and generating an error signal if an error is detected;

a plurality of counter means, each in communication with one of the error detection means and receiving the system clock signal, for generating and storing a system cycle count in response to the system clock signal, each of the counter means including means, connected to receive the error signal from the one error detection means, for freezing the system cycle count upon receipt of the error signal;

means, in communication with the plurality of error detection means, responsive to the error signals for generating the disable signal.

9. The apparatus of claim 8, wherein the data registers are organized in sections of the data processing machine, further including a plurality of means, each in communication with the error detection means for data registers within one section of the system, for combining the error signals from the one section to generate a section-level process damage signal; and a plurality of section-level counter means, each connected to receive one section-level process damage signal and receiving the system clock signal, for generating and storing a system cycle count in response to the system clock signal, each of the counter means including means for freezing the system cycle count upon receipt of the one section-level process damage signal.

10. The apparatus of claim 9, wherein the sections are organized into blocks of sections and further including:

a plurality of means, each associated with a given block and connected to receive the section-level process damage signals from sections within the given block, for combining the section-level process damage signals to generate a block-level process damage signal; and the means for generating the disabled signal includes means for combining the block-level process damage signals for supply as the disable signal.

11. The apparatus of claim 8, wherein the data words include data and an error code for the data and the error detection means include means responsive the data and the error code for detecting errors in the data.

12. The apparatus of claim 11, wherein the error code is a parity bit.

* * * * *